United States Patent [19]

Plocek et al.

[11] Patent Number: 4,904,190
[45] Date of Patent: Feb. 27, 1990

[54] ELECTRICAL CONNECTOR ASSEMBLY FOR VEHICULAR STEERING WHEEL

[75] Inventors: Edward J. Plocek, Lisle, Ill.; William H. Hyslop, Sylvan Lake, Mich.

[73] Assignee: Molex Incorporated, Del.

[21] Appl. No.: 252,308

[22] Filed: Oct. 3, 1988

[51] Int. Cl.⁴ .................. H01R 39/02; H01R 39/28
[52] U.S. Cl. .................................. 439/15; 439/17; 439/29
[58] Field of Search .................. 439/15, 17, 18, 21, 439/22, 27, 29

[56] References Cited

U.S. PATENT DOCUMENTS

| 1,174,379 | 3/1916 | Bacon | 439/17 |
| 2,645,759 | 7/1953 | Solari | 439/22 |
| 4,183,598 | 1/1980 | Aarninkhof | 439/17 |

FOREIGN PATENT DOCUMENTS 1055042 10/1953 France .................. 439/21

Primary Examiner—Eugene F. Desmond
Attorney, Agent, or Firm—Louis A. Hecht; Stephen Z. Weiss

[57] ABSTRACT

An electrical connector assembly is provided for components that are rotatable relative to one another, such as a steering column and a steering wheel for a vehicle. The assembly comprises a steering column cassette and an opposed mateable steering wheel cassette. Concentric recesses are formed in the mating face of at least one of the cassettes. The opposed mating surfaces are further defined by discrete concentric conductive portions formed on the cassettes. At least one resilient electrically conductive contact member is resiliently engaged between the cassettes to make redundant electrical contact with the opposed concentric contact portions of each cassette. The cassettes may be appropriately configured for environmental sealing.

24 Claims, 6 Drawing Sheets

ELECTRICAL CONNECTOR ASSEMBLY FOR VEHICULAR STEERING WHEEL

BACKGROUND OF THE INVENTION

Vehicular steering wheel assemblies typically comprise a centrally disposed nonrotatable steering column and a rotatable steering wheel. A rotatable shaft extends centrally through the steering column to enable the movements of the steering wheel to be transmitted appropriately to the wheels on which the vehicle is supported.

Virtually all vehicles require electrical connections to be made between the stationary steering column and the rotatable steering wheel. For example, electrical circuits extending from the nonrotatable steering column to the rotatable steering wheel may relate to the horn, driver-side emergency air bags and electrical accessories that may have primary or redundant controls mounted on the hub of the steering wheel.

The typical prior art electrical connections for steering wheel assemblies include opposed plates mounted respectively on the stationary column or rotatable steering wheel with flat flexible cables extending therebetween. This prior art assembly might include thirty feet of flat flexible cable wound in a clock spring manner. Opposed ends of the flat flexible cables are terminated to electrical connectors, which in turn are mounted to the opposed plates on the stationary steering column or rotatable steering wheel. These prior art assemblies with flat flexible cables extending between the stationary steering column and the rotatable steering wheel have a very high relative cost because of the large number of components and the large amount of flat flexible cable required. Additionally, it is extremely difficult to assemble the prior art components in a manner that ensures relatively free movement of the rotatable steering wheel without overstressing of the flat flexible cable at any location throughout the movement. These prior art assemblies relying on flat flexible cables have also prevented the use of a steering wheel assembly that could undergo unlimited free rotation relative to the stationary steering column. Thus, to prevent overstress on the flat flexible cable it is necessary to provide these prior art structures with appropriate means for preventing excessive rotation of the steering assembly relative to the stationary steering column. Even if these prior art assemblies can be properly assembled by original equipment manufacturers, there can be no assurance that automobile mechanics performing routine maintenance and repairs will achieve proper reassembly. It has also been found that the flat flexible cables will cause an audibly noticeable "cable slap" during normal rotation of the steering wheel. In some instances, a separate sound insulation has been required to attenuate the "cable slap" noises.

The prior art has included attempts to overcome the above described deficiencies of steering wheel assemblies employing flat flexible cable. In general these prior art attempts include opposed annular rings of conductive material nonrigidly mounted respectively to nonconductive portions of the stationary steering column and the rotatable steering wheel. The mounting of the rings has required complex means for permitting a controlled axial movement of the rings relative to the respective steering column and steering wheel. The prior art structures have further included complex biasing means for urging the annular electrically conductive rings toward one another and away from the respective steering column and steering wheel. The electrically conductive rings of the prior art structure are formed with annular channels having generally semicircular cross sections. Rigid metallic ball bearings are disposed in the channel between the annular nonrigidly mounted electrically conductive rings of the prior art structure to provide electrical connection between the rings. The contact against the rigid metallic ball bearings is achieved by the complex biasing means which urge the rings toward the rigid ball bearings. At least three or more ball bearings typically are provided for each pair of annular rings, with the prior art assembly typically being provided with complex means for controlling the circumferential position of the rigid ball bearings relative to one another to ensure that the ball bearings do not all roll together at a single location relative to the annular electrically conductive rings. Examples of assemblies of this general type are shown in U.S. Pat. No. 4,548,454 which issued to Zeller et al. on Oct. 22, 1985; U.S. Pat. No. 4,462,648 which issued to Fohl on July 31, 1984; and U.S. Pat. No. 4,475,779 which issued to Fohl on Oct. 9, 1984. Although this prior art avoids the use of flat flexible cables, the resulting structure with axially movable electrically conductive rings, springs to axially move the rings, electrical connections to the movable rings, rigid ball bearings between the rings and means for controlling the location of the ball bearings all are extremely complex and expensive.

Other prior art steering wheel assemblies include an apparatus having complexly configured annular contacts which are incorporated concentrically in interfitting electrical contact. These complexly configured rings are maintained in electrical contact by a plurality of coil springs aligned such that the longitudinal axes of the coil springs are parallel to the longitudinal axis of the steering column to urge the complexly configured electrically conductive rings in axial directions and into electrical contact with one another. The complexly configured rings are extremely expensive to manufacture, and the entire assembly is costly and undesirably complex. A device of this type is shown in U.S. Pat. No. 4,714,430 which issued to Zeller on Dec. 22, 1987.

The above described attempts to avoid flat flexible cable sometimes have replaced the "cable slap" noise with audibly distinct clicking caused by the complex interengagement of parts.

The complexities of all of the above described prior art substantially prevent increases in circuit density without corresponding increases in at least the radial dimensions of the assemblies and the entire steering column.

Recent advances have been made in three-dimensional molded wiring board technology employing the discrete plating of electrically conductive materials to various nonconductive plastic structures. In particular, the electrically conductive materials have been selectively disposed on the plastic to define electrically conductive surface regions extending through a three-dimensional matrix to define discrete conductive tracks for incorporation into electrical circuits. This three-dimensional molding technology is currently available from Mint Pac and others.

In view of the above, it is an object of the subject invention to provide improved electrical connections for steering wheel assemblies.

It is another object of the subject invention to provide electrical connections for steering wheel assemblies that can be manufactured easily and inexpensively, and that can be efficiently assembled.

Another object of the subject invention is to provide electrical connections between stationary and rotatable objects that avoid the use of cables and that employ a substantially minimum number of components.

Still a further object of the subject invention is to provide improved electrical connections between stationary and rotatable objects that can be efficiently environmentally sealed.

Yet another object of the subject invention is to provide efficient electrical connection between stationary and rotatable objects, such as in a steering wheel assembly, which insures redundant high quality electrical connection for all relative rotational orientations.

An additional object of the subject invention is to provide greater circuit density for electrical connection between a stationary steering column and a rotatable steering wheel, thereby enabling more electrical controls on the steering wheel.

Another object of the subject invention is to provide for continuous unlimited bidirectional rotation in an electrical connection between a steering column and a steering wheel.

Still another object of the subject invention is to provide a substantially noise-free electrical connection between a steering column and a steering wheel.

SUMMARY OF THE INVENTION

The electrical connector assembly of the subject invention is directed to a first housing that may be mounted on a nonrotatable steering column and a second housing that may be mounted on or comprise a portion of a rotatable steering wheel or the rotatable shaft extending from the steering wheel. The assembly frequently is referred to in the trade as a steering cassette assembly. The stationary and rotatable housings of the assembly comprise portions formed from a nonconductive material. These nonconductive portions may comprise a molded plastic material.

The stationary and rotatable housings of the subject electrical connector assembly further comprise at least one opposed pair of annular conductive portions which are generally concentric with the axis of rotation of the rotatable housing. At least one of the annular conductive portions in each opposed pair may be disposed in a recess in the corresponding nonconductive portions of the stationary or rotatable housing. The annular conductive portions of the stationary and rotatable housings preferably are substantially rigidly and nonrotatably mounted to the corresponding housing. Thus, the annular conductive portion of the stationary housing will remain stationary, while the annular conductive portion of the rotatable housing will rotate with the rotatable housing. The rigid mounting of the annular conductive portions to the respective stationary and rotatable housings avoids the complex biased axially movable conductor mountings as in the prior art explained above.

The annular conductive portions of the stationary and rotatable housings may be defined by metallic rings rigidly secured in concentric arrays. Thus, the annular conductive portions may be defined by insert molding, stamped circuitry or the like. Preferably, however, the annular conductive portions may be defined by an electrically conductive material selectively plated to the nonconductive material to define discrete annular conductive tracks on a nonconductive substrate of the housings. These discrete annular conductive tracks may comprise annular surface regions of the associated stationary or rotatable housings. Preferably the stationary and rotatable housing each are provided with a plurality of concentric annular conductive tracks as defined above. The plated conductive tracks may comprise or be connected to other conductive portions which are disposed in the respective rotatable and nonrotatable housing to permit electrical connection with other electrical circuitry. For example, the stationary and rotatable housings may be provided with axially aligned through holes that also are plated with the conductive material to permit electrical connection of the concentric conductive portions to other circuitry. The selectively plated annular conductive portions and the plated through holes preferably are defined by the above mentioned three-dimensional molding technology which is available through Mint Pac and others. The stationary and rotatable housings including the respective annular concentric conductive portions thereof may define a preassembled cassette or cartridge that is removably mountable to a stationary steering column or a rotatable steering wheel component respectively.

Electrical connection between the concentric conductive portions of the stationary and rotatable housings is provided by resilient conductive contact members disposed at radial positions for achieving electrical connection between each pair of opposed concentric conductive portions. In particular, the resilient conductive contact members may be defined by at least one electrically conductive wave washer having a radius substantially equal to the radius defined by the opposed concentric conductive portions of the stationary and rotatable housings. The wave washer may be retained in a concentric orientation relative to the corresponding opposed conductive portions by a concentric recess formed in the nonconductive portions of the stationary and/or rotatable housings. The wave washer may be formed to define a plurality of undulations about its circumference, and preferably at least three undulations about its circumference to provide redundant electrical contact between each pair of opposed conductive portions. Preferably a plurality of wave washers of different radial dimensions are disposed in a concentric array to align with and achieve electrical contact between a corresponding array of opposed pairs of electrically conductive portions on the respective stationary and rotatable housings.

The resilient conductive contact members may alternatively be defined by resilient electrically conductive spheres that are mounted at an appropriate radial position to engage the concentric conductive portions in each pair of opposed concentric conductive portions. The resilient electrically conductive spheres may be molded or otherwise formed from an electrically conductive polymer. The resilient electrically conductive spheres may be retained in a proper radial position by an annular recess formed in the stationary housing and/or in the rotatable housing. A plurality of resilient electrically conductive spheres may be provided for each of the concentric conductive portions on the stationary and rotatable housings. In particular, at least three resilient electrically conductive spheres may be provided for each of the opposed pairs of conductive portions on the respective stationary and rotatable housings. The resilient electrically conductive spheres for each pair of opposed electrically conductive portions may be maintained in a selected circumferential orientation to one another by a nonconductive support means disposed between the rotatable and nonrotatable housings. For example, the nonconductive support means may be defined by a generally planar circular spacer disk having at least one array of apertures extending therethrough, with each such aperture being dimensioned to receive one resilient electrically conductive sphere. The apertures may be disposed on the nonconductive spacer disk to separate the resilient electrically conductive spheres circumferentially by a selected amount, such as 120°.

In many environments the contact provided between the rotatable and nonrotatable housings should be splash proof or otherwise environmentally protected. This environmental sealing may be achieved by appropriately sealing the entire steering column. Alternatively, generally annular sealing means may be provided between the stationary and rotatable housings at radially outward and/or radially inward positions thereon. The annular sealing means may comprise a labyrinth seal comprising interengaging annular grooves and ridges on the opposed portions of the stationary and rotatable housings. Alternatively, appropriately configured annular gaskets may be received in correspondingly dimensioned annular grooves in the respective stationary and rotatable housings.

The electrical connector assemblies described above are formed from substantially fewer components than corresponding prior art structures for achieving electrical connection between a stationary and a rotatable member. Additionally, the fewer components provided by the subject assembly are easily assembled or reassembled, thereby providing further efficiencies. This ease of assembly is further attributable to the continuous bidirectional rotation which is enabled, thereby avoiding the need to align the members at a particular rotational starting point which had been necessary in assemblies employing flat flexible cable. In addition to the lower costs and the assembly efficiencies, the subject design ensures high quality redundant electrical connection for each circuit required between the stationary and rotatable housings. The simple design with few components further enables the extremely important advantage of much greater circuit densities without corresponding increases in the size of the assembly or cassette. This enables more electronic controls to be placed on the steering wheel than had previously been possible. Furthermore, the subject design entirely eliminates the bothersome "cable slap" or clicking noises which had been present in the prior art, thereby avoiding the need for separate sound insulation.

DETAILED DESCRIPTION OF THE PREFERRED EMBODIMENTS

Figure 1:
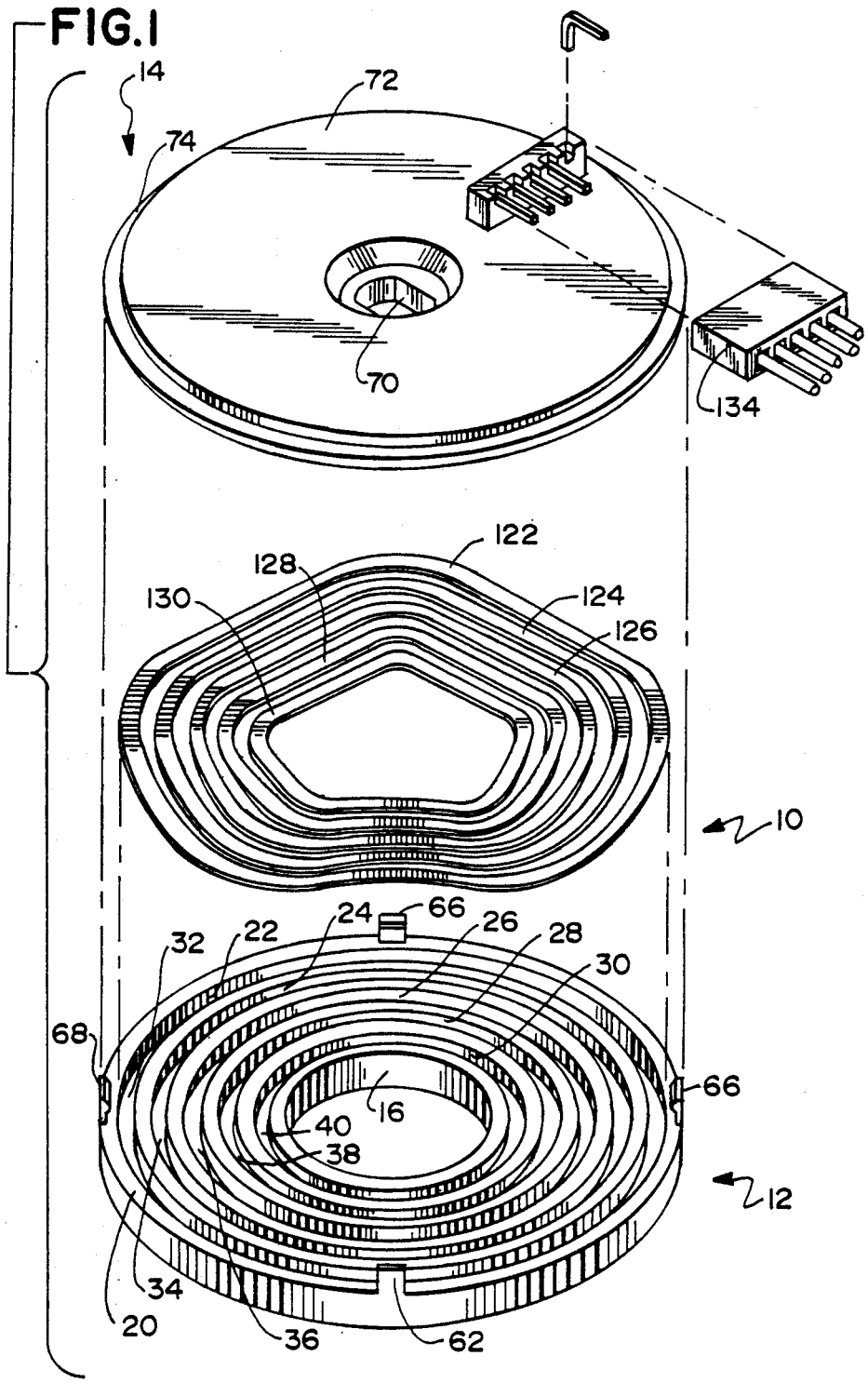
FIG. 1 is an exploded perspective view of a steering column electrical connector assembly in accordance with the subject invention.
Figure 2:
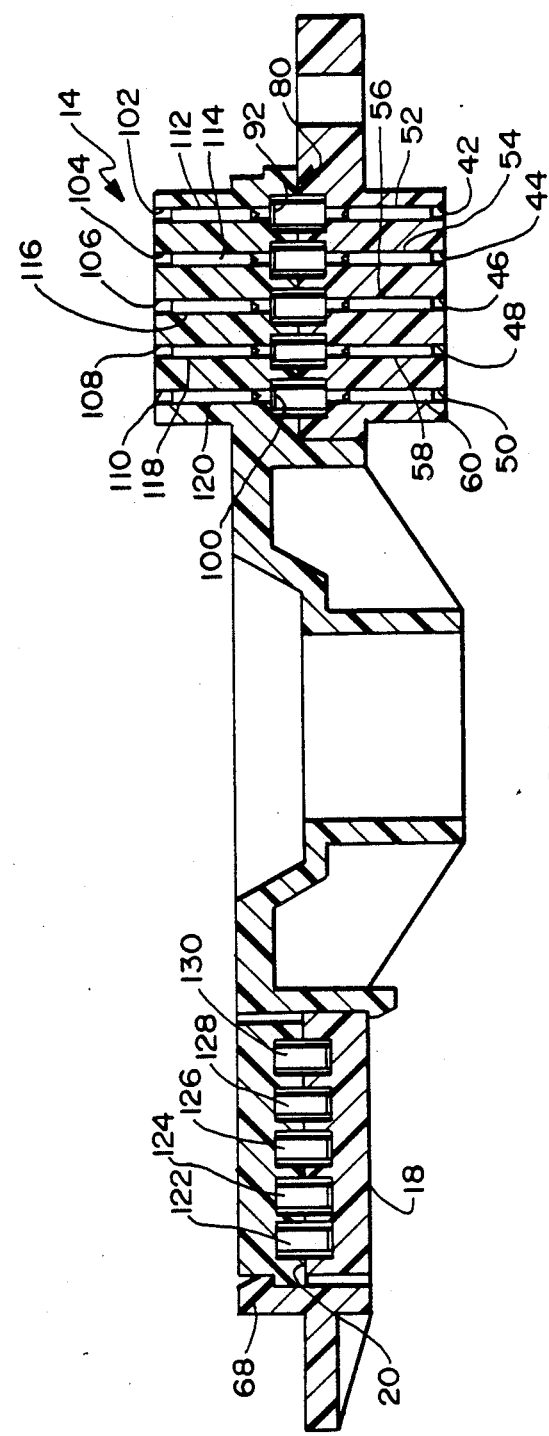
FIG. 2 is a cross-sectional view of the electrical connector assembly of FIG. 1 in its assembled condition.

A steering column electrical connector assembly in accordance with the subject invention is illustrated in FIGS. 1 and 2 and is identified generally by the numeral 10. The assembly 10 comprises a steering column cassette 12, and a mateable steering wheel cassette 14. The cassettes 12 and 14 are molded from a nonconductive plastic material and preferably an amorphous thermoplastic polyetherimide with glass reinforcing. The cassettes 12 and 14 effectively define mateable housings for conductive portions of the assembly 10 as explained herein.

The steering column cassette 12 is of generally circular configuration and includes a generally circular through aperture 16 concentrically disposed therein. The steering column cassette 12 further comprises a steering column mounting surface 18 and an opposed mating surface 20. The mating surface 20 of the steering column cassette 12 includes a plurality of annular concentric recesses 22-30 molded therein. The concentric recesses 22-30 each are provided with continuous electrically conductive surfaces plated thereon to define an array of discrete concentric conductive plated tracks 32-40 in the recesses 22-30 respectively. The steering column cassette 12 is further characterized by an array of through apertures 42-50 extending into the respective annular passages 22-30 from the steering column mounting side 18 thereof. The through passages 42-50 are also appropriately plated with the conductive material so as to be electrically connected to the concentric conductive tracks 32-40 respectively. The electrically conductive plating on the through apertures 42-50 and the electrically conductive concentric tracks 32-40 preferably are defined by nickel or copper discretely plated on the indicated surface portions of the steering column cassette 12. In view of this construction, terminals or other contact members can be inserted into the plated through holes 42-50 to achieve electrical contact respectively with the discrete concentric conductive tracks 32-40. The molding of the steering column cassette 12 and the plating of the discrete conductive portions thereon preferably is carried out with three-dimensional molding technology that is available through Mint Pac and others.

The steering column cassette 12 is further provided with resilient cantilevered latches 62-68 unitarily molded therewith for loosely connecting the steering column cassette 12 to the steering wheel cassette 14. In particular, the latched connection between the steering column cassette 12 and the steering wheel cassette 14 achieved by the latches 62-68 limits the relative axial movement therebetween, but permits free rotational movement.

The steering wheel cassette 14 is provided with a central mounting aperture 70 which is of non-circular configuration and is mateable to corresponding structure on a steering wheel. The non-circular configuration of the aperture 70 enables the aperture 70 to be nonrotatable with respect to a rotatable shaft extending from a steering wheel, and to thereby rotate relative to the steering column cassette 12 in response to rotative forces exerted on a steering wheel.

The steering wheel cassette 14 includes a mounting surface 72 for mounting in opposed relationship to the steering wheel. The outer circumference of the surface 72 is characterized by a generally rabbet-like groove 74 which is engagable by the latches 62–68 on the steering column cassette 12.

The steering wheel cassette 14 is further characterized by a mating surface 80 having concentric recesses 82–90 molded therein. As shown in FIG. 2, the recesses 82–90 molded into the steering wheel cassette 14 are concentric and registrable with the recesses 22–30 in the steering column cassette 12. Portions of each recess 82–90 molded in the steering wheel cassette 14 are provided with continuous annular electrically conductive portions plated thereon to define discrete concentric conductive tracks 92–100 which are registrable with the concentric conductive tracks 32–40 on the steering column cassette 12. The steering wheel cassette 14 is further molded to include through apertures 102–110 which also are appropriately plated with the electrically conductive material, and which are electrically connected respectively to the concentric conductive tracks 92–100. Terminals 112–120 are electrically connected to the plated through holes 102–110 to permit electrical connection of the steering wheel cassette 14 to other circuitry as appropriate. The steering wheel cassette also preferably employs the three-dimensional molding technology described above.

The assembly 10 further comprises an array of circular wave washers 122–130 which are dimensioned respectively to be received within the concentric recesses 22–30 and 82–90 molded respectively in the steering column cassette 12 and the steering wheel cassette 14. The amplitude of the waves defined by the wave washers 122–130 is such that the respective wave washers 122–130 are deflected by the assembly of the cassettes 12 and 14 to achieve a high quality electrical connection to the concentric conductive tracks 32–40 of the steering column cassette 12 and to the concentric conductive tracks 92–100 of the steering wheel cassette 14. Additionally, as shown most clearly in FIG. 1, each electrically conductive wave washer 122–130 is formed to define four waves in each direction about its circumference. Thus, each wave washer will achieve redundant electrical connection between the concentric conductive tracks 32–40 and 92–100 respectively.

Electrical connectors 132 and 134, as shown in FIG. 1, can be employed to make appropriate electrical connection to the terminals 52–60 in the steering column cassette 12 and to the terminals 112–120 in the steering wheel cassette 14.

It will be appreciated that the assembly 10 achieves redundant high quality electrical connection for all possible rotational orientations of the steering wheel cassette 14 relative to the nonrotatably mounted steering column cassette 12. Additionally, it will be appreciated that the assembly 10 is of extremely simple construction with few parts, easy assembly and continuous noise-free bidirectional rotatability after assembly.

Figure 3:
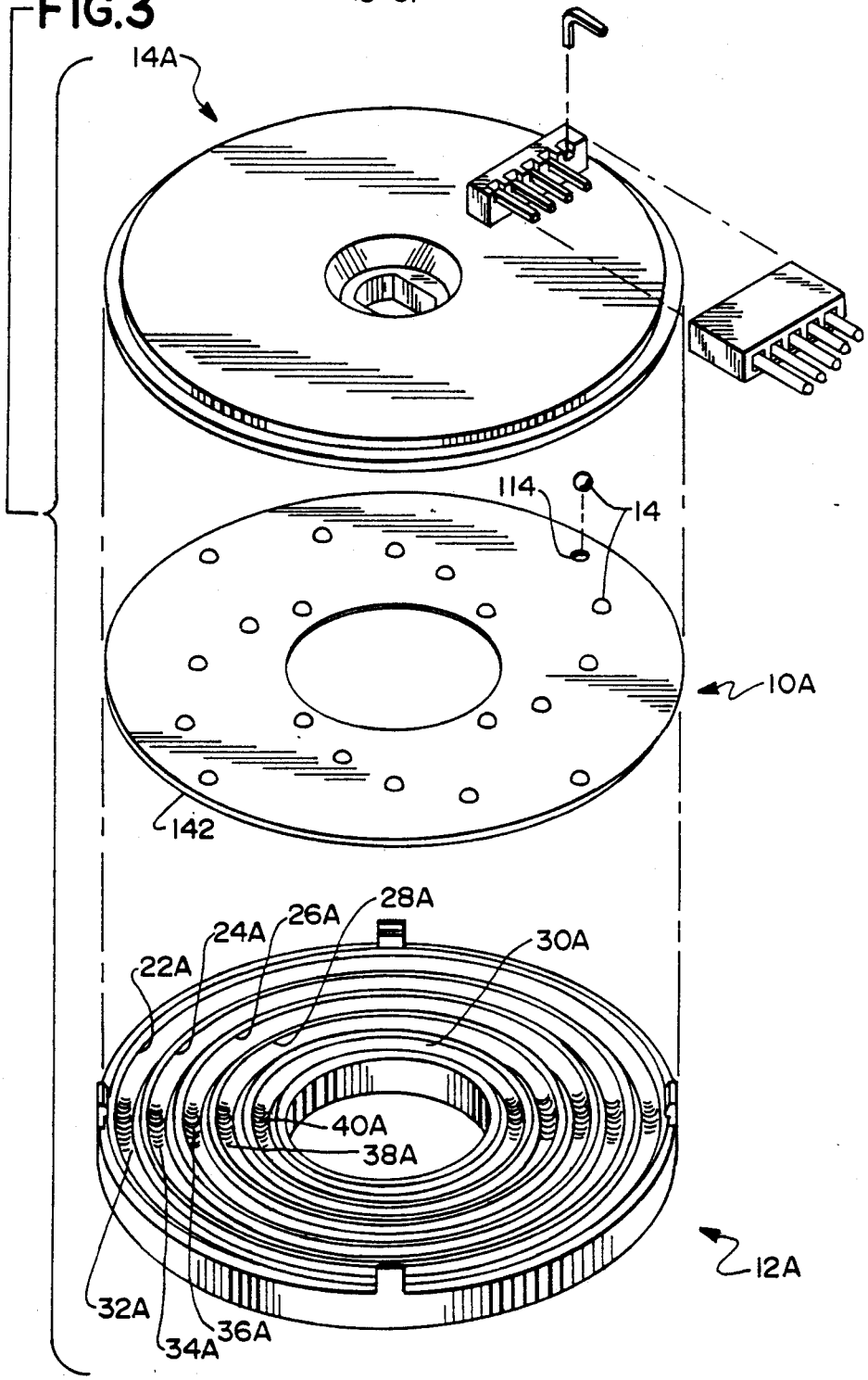
FIG. 3 is an exploded perspective view of an alternate steering column electrical connector assembly in accordance with the subject invention.
Figure 4:
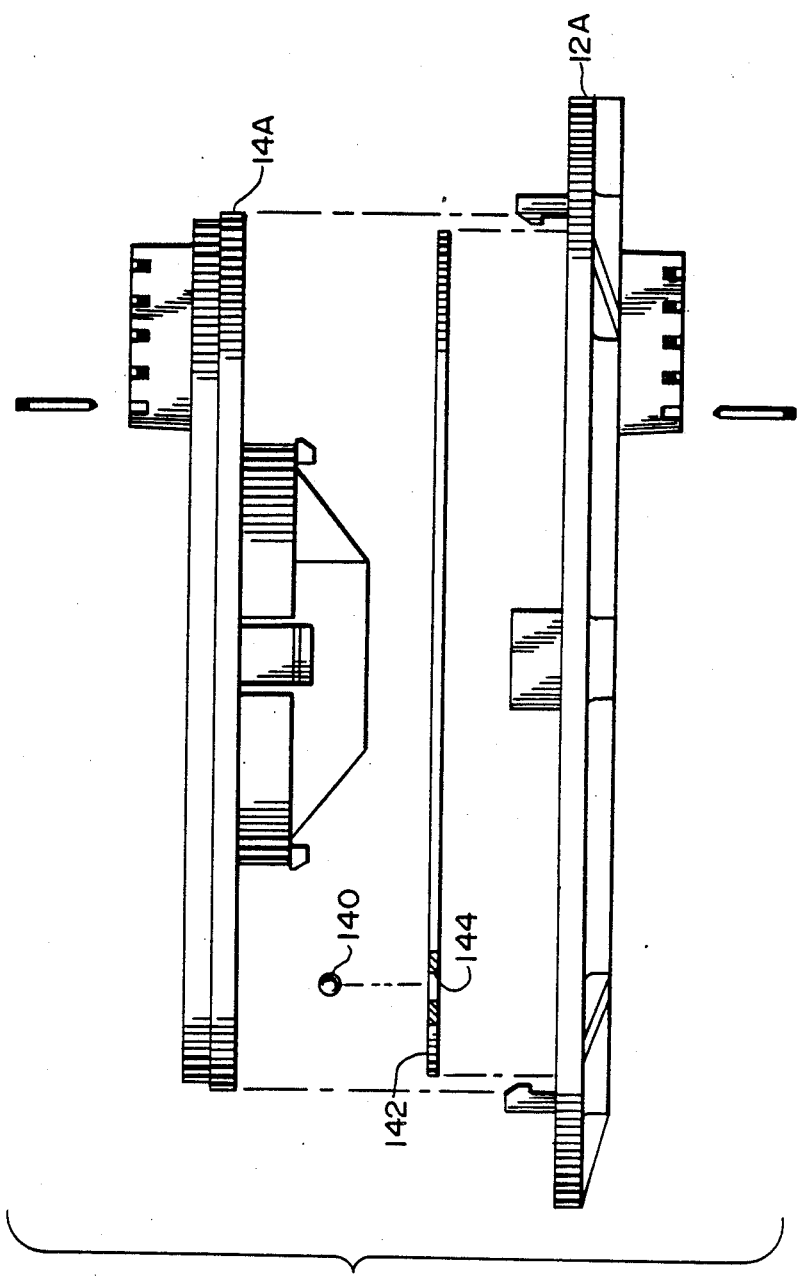
FIG. 4 is an exploded side view of the electrical connector assembly depicted in FIG. 3.
Figure 5:
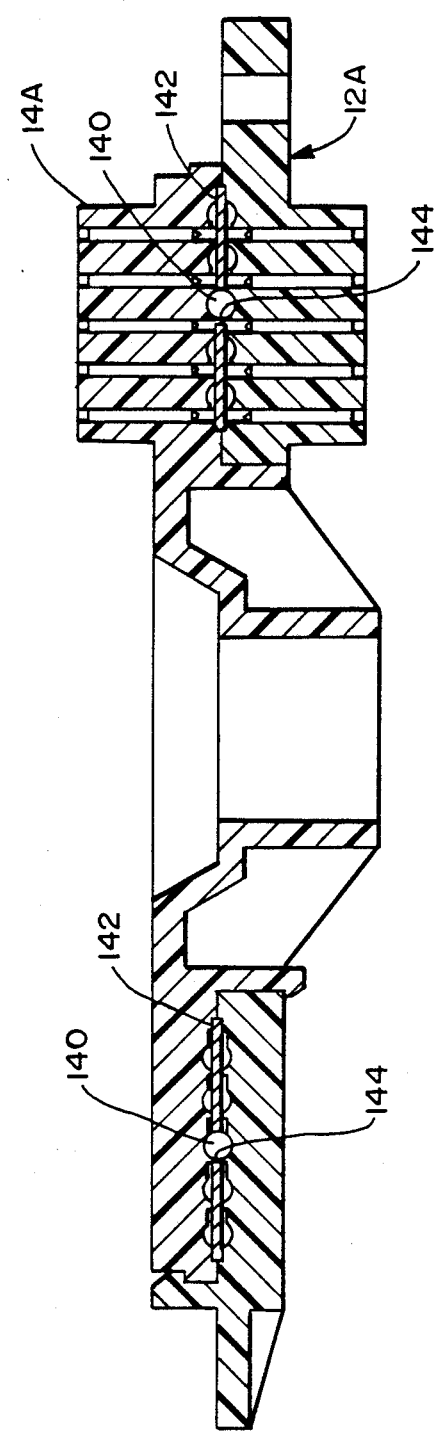
FIG. 5 is a cross-sectional view of the electrical connector assembly of FIGS. 3 and 4 in the assembled condition.

An alternate embodiment of the steering column electrical connector assembly is illustrated in FIGS. 3–5 and is identified generally by the numeral 10A. The assembly 10A comprises a steering column cassette 12A and a steering wheel cassette 14A which are substantially similar to the corresponding components of the assembly 10 described above and illustrated in FIGS. 1 and 2. However, the steering column cassette 12A includes concentric recesses 22A–30A which are similar to the recesses 22–30 of the steering column cassette 12, but which are of generally semicircular cross-sectional configuration. Continuous concentric portions of the concentric recesses 22A–30A are appropriately plated with an electrically conductive material and therefore define concentric conductive tracks 32A–40A which are structurally and functionally similar to the conductive tracks 32–40 of the steering column cassette 12. In a similar manner, the steering wheel cassette 14A is provided with concentric recesses 82A–90A which are similar to the concentric recesses 82–90 in the steering wheel cassette 14, but which are of semicircular cross section. The concentric recesses 82A–90A formed in the steering wheel cassette 14A also are provided with conductive plating to define discrete concentric conductive tracks 92A–100A which are similar to the concentric conductive tracks 92–100 in the steering wheel cassette 14 described and illustrated above.

Unlike the assembly 10, the assembly 10A depicted in FIGS. 3–5 does not include the array of concentric wave washers. Rather, the electrical connection between the concentric conductive tracks 32A–40A of the steering column cassette 12A and the concentric conductive tracks 92A–100A of the steering wheel cassette 14A are provided by resilient electrically conductive spheres 140. In particular, the spheres 140 are formed from an electrically conductive silicone having elastomeric characteristics and impregnated with a precious or semiprecious metal. The resilient conductive spheres 140 are dimensioned to be elastomerically engaged in rolling contact in their respective semicircular cross-sectional concentric recesses 22A–30A of the steering column cassette 12A and the corresponding semicircular cross-sectional concentric recesses 82A–90A of the steering wheel cassette 14A. The elastomeric characteristics and the dimensions of the conductive spheres 140 ensure a high quality electrical connection to the respective concentric conductive tracks 32A–40A and 92A–100A. Additionally, the spherical configuration of the conductive spheres 140 ensures that the spheres will roll into secure electrical contact for all angular orientations of the steering wheel cassette 14A relative to the steering column cassette 12A.

A plurality of the resilient conductive spheres 140 are disposed in each of the respective concentric recesses 22A–30A and 82A–90A. The spheres 140 in each of the respective aligned recesses are maintained in a fixed circumferential position relative to one another by spacer disk 142. More particularly, the spacer disk 142 is a generally planar unitary structure of annular configuration with a plurality of apertures 144 therein. Each aperture 144 is dimensioned to loosely retain a sphere 140, but to maintain the sphere 140 at a generally specified radial and circumferential location. More particularly, the apertures 144 are formed in the spacer disk 142 such that a plurality of the spheres 140 are disposed in spaced angular relationship in each of the respective concentric recesses 32A–40A and 82A–90A. The spacer disk 142 can be simply molded or otherwise formed from an appropriate nonconductive material. However, this simple construction ensures that the resilient conductive spheres 140 are substantially evenly spaced about the cassettes 12A and 14A to achieve a high quality redundant electrical connection between the respective circuits in the cassettes 12A and 14A.

Figure 6:
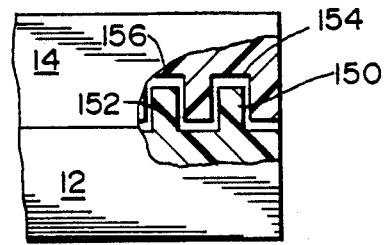
FIG. 6 is a cross-sectional view of a splash resistant seal for incorporation into the electrical connector assembly in accordance with the subject invention.
Figure 7:
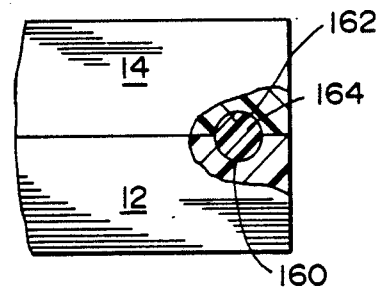
FIG. 7 is a cross-sectional view of an alternate seal for incorporation into the subject electrical connector assembly.
Figure 8:
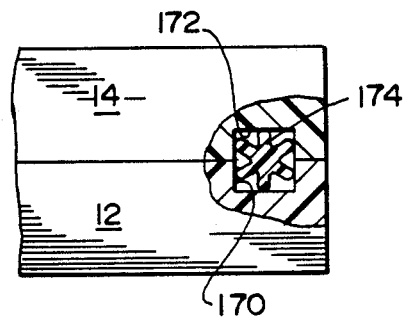
FIG. 8 is a cross-sectional view of a second alternate seal for incorporation into the subject electrical connector assembly.

In many situations it may be desirable for the cassettes to provide or contribute to environmental protection of the electrical circuits contained therein. Optional environmental sealing means for the cassettes described and illustrated above are shown in FIGS. 6–8. It will be appreciated that FIGS. 6–8 are partial cross-sectional views of the cassettes 12 and 14 taken at radially outwardly disposed locations thereon. The sealing structures shown in the cross sections of FIGS. 6–8 would be generally annular in plan view and extend substantially entirely around the circumference of the respective cassettes 12 and 14 or 12A and 14A. Similar or identical seals also could be disposed at radially inner locations. In particular, FIG. 6 shows the nonconductive molded portions of the steering column cassette 12 being formed with pairs of annular spaced apart ribs 150 and 152. The steering wheel cassette 14 is provided with corresponding annular grooves 154 and 156 which are disposed and dimensioned to engage the ribs 150 and 152. As illustrated in FIG. 6, the ribs 150 and 152 are loosely received within the grooves 154 and 156 to permit free rotation of the steering wheel cassette 14 relative to the steering column cassette 12. Although the construction shown in FIG. 6 would provide splash resistance acceptable for most applications, it could not be considered to provide vapor resistance which may be required in certain instances.

FIGS. 7 and 8 show seal configurations which can be vapor resistant. In particular, FIG. 7 shows annular grooves of generally semicircular cross section formed in radially outward locations on the steering column cassette 12 and the steering wheel cassette 14. The grooves 160 and 162 are dimensioned to receive an annular gasket 164. The relative dimensions of the grooves 160, 162 and the gasket 164 and the materials from which the gasket 164 is formed should be selected to provide an acceptable degree of environmental sealing without significantly affecting the free rotation of the steering wheel cassette 14 relative to the steering column cassette 12.

FIG. 8 shows the steering column cassette 12 and the steering wheel cassette 14 formed respectively with grooves 170 and 172 of generally rectangular cross section. A resilient ribbed gasket 174 is mounted in the grooves 170 and 172 to provide the necessary environmental sealing without impeding upon the free rotatability of the steering wheel cassette 14 relative to the steering column cassette 12.

In summary, a steering column electrical connector assembly is provided comprising a steering column cassette and a mateable steering wheel cassette which are engagable with one another to permit free rotation therebetween. Arrays of concentric recesses are formed on the mating surfaces of the steering column cassette and steering wheel cassette. The mating surfaces are further provided with discretely disposed concentric electrically conductive portions in register with one another and in register with the respective recesses. Resilient electrically conductive members such as resilient wave washers or resilient electrically conductive spheres are disposed between the cassettes and retained in alignment with the concentric conductive pathways on the respective cassettes. The use of resilient conductive members provides an extremely efficient, inexpensive and noise-free high quality redundant electrical connection between the respective concentric conductive passages. The subject construction also enables continuous bidirectional rotation and substantially increased circuit density. The steering column cassette and the steering wheel cassette can be appropriately formed for the required degree of environmental sealing.

While the invention has been described with respect to certain preferred embodiments, it is apparent that various changes can be made without departing from the scope of the invention as defined by the appended claims. In particular, other configurations of resilient conductive members retained in the concentric recesses can be provided. Similarly, the annular conductive portions of the respective cassettes may be formed by insert molding, stamped circuitry or other means. Additionally, many other possible environmental sealing constructions can be employed to achieve the required degree of splash protection or environmental sealing.

We claim:

1. An electrical connector assembly for achieving electrical connection between first and second members at least one of which is rotatable relative to the other, said assembly comprising:

a first housing mountable to said first member and comprising a nonconductive portion having a mating face and a plurality of annular conductive portions plated on said mating face;

a second housing mountable to said second member and comprising a nonconductive portion having a mating face disposed in generally opposed relationship to the mating face of said first housing, said first and second housings being rotatable relative to one another, said second housing having a plurality of annular conductive portions plated on the mating face thereof generally in register with the annular conductive portions on the mating face of said first housing to define pairs of opposed annular conductive portions, the annular conductive portions of said first and second housings being in spaced relationship to one another; and at least one resilient conductor member disposed between the mating faces of said first and second housings and retained at a radial position for resiliently engaging both annular electrically conductive portions in one said pair of opposed annular conductive portions for achieving electrical connection therebetween while permitting rotation of said first and second housings relative to one another.

2. An electrical connector assembly mounted about the longitudinal axis of a torque transmitting shaft which shaft passes through said assembly and has a rotational relationship with a part which is stationary or rotating for achieving electrical connection between first and second members at least one of which is rotatable relative to the other, said assembly comprising:

a first housing mountable to said first member and comprising a nonconductive portion having a mating face and at least one annular conductive portion fixedly disposed on said mating face;

a second housing mountable to said second member and comprising a nonconductive portion having a mating face disposed in generally opposed relationship to the mating face of said first housing, said first and second housings being rotatable relative to one another, said second housing having at least one annular conductive portion fixedly disposed on the mating face thereof generally in register with the annular conductive portion on the mating face of said first housing to define at least one pair of opposed annular conductive portions, the annular conductive portions of said first and second housings being in spaced relationship to one another;

at least one resilient conductor member disposed between the mating faces of said first and second housings and retained at a radial position for resiliently engaging both annular electrically conductive portions in one said pair of opposed annular conductive portions for achieving electrical connection therebetween while permitting rotation of said first and second housings relative to one another; and said mating faces of said first and second housings are formed to define sealing means for environmentally sealing said first and second housings to one another.

3. An electrical connector assembly as in claim 2 wherein said first and second housings each comprise a plurality of annular conductive portions disposed on the mating faces thereof, with the annular conductive portions of said first housing being registered with the annular conductive portions of said second housing.

4. An electrical connector assembly as in claim 2 wherein the sealing means comprises at least one annular groove in said first housing and at least one annular ridge in said second housing, said ridge being engaged in the annular groove.

5. An electrical connector assembly as in claim 2 wherein the sealing means comprises registered annular grooves formed in the mating faces of said first and second housings, said sealing means further comprising a resilient gasket disposed in the annular grooves.

6. An electrical connector assembly as in claim 2 wherein the mating face of at least one of said first and second housings comprises at least one annular recess, with the annular conductive portion being disposed in the annular recess, whereby said annular recess retains the resilient conductor at a radial position for electrically contacting the annular conductive portions in said opposed pair of annular conductive portions.

7. An electrical connector assembly as in claim 6 wherein said first and second housings each comprise at least one annular recess in the respective mating faces thereof, the annular conductive portions thereof being disposed in said recesses.

8. An electrical connector assembly mounted about the longitudinal axis of a torque transmitting shaft which shaft passes through said assembly and has a rotational relationship with a part which is stationary or rotating for achieving electrical connection between first and second members at least one of which is rotatable relative to the other, said assembly comprising:

a first housing mountable to said first member and comprising a nonconductive portion having a mating face and at least one annular conductive portion fixedly disposed on said mating face;

a second housing mountable to said second member and comprising a nonconductive portion having a mating face disposed in generally opposed relationship to the mating face of said first housing, said first and second housings being rotatable relative to one another, said second housing having at least one annular conductive portion fixedly disposed on the mating face thereof generally in register with the annular conductive portion on the mating face of said first housing to define at least one pair of opposed annular conductive portions, the annular conductive portions of said first and second housings being in spaced relationship to one another; and at least one resilient electrically conductive sphere disposed between the mating faces of said first and second housings and retained at a radial position for resiliently engaging both annular electrically conductive portions in one said pair of opposed annular conductive portions for achieving electrical connection therebetween while permitting rotating of said first and second housings relative to one another.

9. An electrical connector assembly as in claim 8 wherein said assembly comprises a plurality of resilient electrically conductive spheres disposed in contact with each of said annular conductive portions in each said opposed pair of annular conductive portions.

10. An electrical connector assembly as in claim 8 further comprising a spacer disk disposed intermediate the mating faces of said first and second housings, said spacer disk being defined by a plurality of apertures disposed therein for maintaining said resilient electrically conductive spheres in selected spaced orientation relative to one another, and relative to said annular conductive portions of said first and second housings.

11. An electrical connector assembly for achieving electrical contact between a first member and a second member which is rotatable relative to said first member, said assembly comprising:

a first housing comprising a nonconductive portion having a mating face formed with an array of concentric recesses therein, each of said concentric recesses comprising a continuous annular surface portion having an electrically conductive material plated thereto for defining an array of concentric electrically conductive surface portions on the mating face of said first housing;

a second housing comprising a nonconductive portion having a mating face disposed in opposed relationship to the mating face of said first housing, the mating face of said second housing being characterized by an array of concentric electrically conductive portions plated thereto and disposed generally in register with and spaced from the electrically conductive portions of said first housing, said second housing being mounted to said first housing for relative rotation therebetween about the axis of said concentric electrically conductive portions of said first and second housings; and a resilient electrically conductive wave washer mounted in each of the respective concentric recesses of said first housing, said wave washer being dimensioned for resiliently contacting the conductive portions in the associated recess of said first housing and the corresponding annular conductive portion of the second housing registered therewith, whereby the resilient spring washers maintain electrical contact between the respective registered concentric electrically conductive portions of said first and second housings for all rotational positions of said first and second housings relative to one another 12. An electrical connector assembly as in claim 11 wherein the second housing comprises an array of concentric recesses in the mating face thereof, the recesses in the second housing being generally in registration with the concentric recesses of said first housing, said concentric electrically conductive portions of said second housing being disposed in the recesses thereof.

13. An electrical connector assembly as in claim 11 further comprising sealing means between said first and second housings for environmentally sealing the conductive portions thereof.

14. An electrical connector assembly as in claim 13 wherein said sealing means comprises a resilient annular gasket disposed between the mating faces of said first and second housings.

15. An electrical connector assembly as in claim 13 wherein said sealing means comprises an annular groove formed in the mating face of one of said first and second housings, and an annular ridge formed in the mating face of the other of said first and second housings, said ridge being engaged in said groove for achieving environmental sealing therebetween.

16. An electrical connector assembly for achieving electrical contact between a first member and a second member which is rotatable relative to said first member, said assembly comprising:
   a first housing comprising a nonconductive portion having a mating face formed with an array of concentric recesses therein, each of said concentric recesses comprising a continuous annular surface portion having an electrically conductive material plated thereto for defining an array of concentric electrically conductive surface portions on the mating face of said first housing;
   a second housing comprising a nonconductive portion having a mating face disposed in opposed relationship to the mating face of said first housing, the mating face of said second housing being characterized by an array of concentric electrically conductive portions plated thereto and disposed generally in register with and spaced from the electrically conductive portions of said first housing, said second housing being mounted to said first housing for achieving relative rotation therebetween about the axis of said concentric electrically conductive portions of said first and second housings; and
   at least one resilient electrically conductive sphere disposed in each of said recesses of said first housing, said sphere being dimensioned for resiliently contacting the electrically conductive portion of the associated recess in said first housing and the electrically conductive portion of said second housing in register therewith.

17. An electrical connector assembly as in claim 16 further comprising sealing means between said first and second housings for achieving environmental sealing thereof.

18. An electrical connector assembly as in claim 16 wherein each said recess comprises a plurality of resilient electrically conductive spheres therein.

19. An electrical connector assembly as in claim 18 further comprising means for maintaining the spheres in each said recess in spaced circumferential relationship to one another.

20. An electrical connector assembly as in claim 19 wherein the means for spacing said spheres comprises a spacer disk disposed intermediate said first and second housings, said spacer disk comprising a plurality of apertures extending therethrough, each said aperture being dimensioned for receiving at least one resilient electrically conductive sphere, said apertures being disposed for achieving a selected spaced orientation of said spheres relative to one another.

21. An electrical connector assembly for completing electrical connections between a nonrotatable vehicular steering column and a rotatable vehicular steering wheel, said assembly comprising:
   a steering column cassette for mounting to the steering column, said steering column cassette comprising a nonconductive portion having a mating face with a plurality of concentric annular recesses formed therein, said steering column cassette further comprising an array of annular conductive portions securely disposed respectively in the annular recesses on the mating face;
   a steering wheel cassette for mounting to the rotatable steering wheel, said steering wheel cassette comprising a nonconductive portion having a mating face which is mateable with the mating face of said steering column cassette, an array of discrete annular concentric conductive portions disposed on the mating face of said steering wheel cassette and dimensioned for being placed in registration with the concentric conductive portions of said steering column cassette; and
   at least one resilient conductor disposed in each respective recess of said steering column cassette and dimensioned for being resiliently engaged intermediate the associated annular conductive portion of said recess and the annular conductive portion on the steering wheel cassette in register therewith, whereby each resilient conductor provides electrical contact between each registered pair of annular conductive portions for all rotational orientations of said steering wheel relative to said steering column.

22. An electrical connector assembly as in claim 21 wherein the annular conductive portions of said steering wheel cassette and said steering column cassette are respectively plated thereto and integral therewith.

23. An electrical connector assembly as in claim 21 wherein the resilient conductor comprises a wave washer.

24. An electrical connector assembly as in claim 21 wherein each said resilient conductor comprises an elastomeric conductive sphere.

* * * * *